United States Patent [19]
Tomozane et al.

[11] Patent Number: 5,589,248
[45] Date of Patent: Dec. 31, 1996

[54] SHAPED GLASS SHEET AND A PROCESS FOR THE PREPARATION THEREOF

[75] Inventors: Shotaro Tomozane; Hirokazu Kidou; Yukikazu Nakabayashi, all of Toyama, Japan

[73] Assignee: Suntec Corporation, Toyama, Japan

[21] Appl. No.: 123,375

[22] Filed: Sep. 17, 1993

[30]  Foreign Application Priority Data

Sep. 18, 1992 [JP] Japan .................................. 4-273386
Sep. 21, 1992 [JP] Japan .................................. 4-274802
Feb. 25, 1993 [JP] Japan .................................. 5-059342
Mar. 1, 1993 [JP] Japan .................................. 5-062491

[51] Int. Cl.$^6$ ...................................................... B32B 1/00
[52] U.S. Cl. ........................ 428/174; 428/34; 428/167; 428/212; 428/213; 52/786.1
[58] Field of Search ................................ 428/182, 184, 428/174, 84, 167, 212, 213, 332, 426; 52/786.1

[56]  References Cited

U.S. PATENT DOCUMENTS 1,156,214 10/1915 Shuman .................................. 428/182
3,762,904 10/1973 Hamilton .................................. 65/107
4,283,451 8/1981 Abrahami .................................. 428/182
4,317,854 3/1982 Rathmell .................................. 428/182
4,853,264 8/1989 Vincent et al. ............................ 428/34

*Primary Examiner*—Donald Loney
*Attorney, Agent, or Firm*—Kane, Dalsimer, Sullivan, Kurucz, Levy, Eisele and Richard, LLP

[57]  ABSTRACT

A shaped glass sheet having a sharp bend is provided, wherein a radius of curvature of an outer circumference of the bend transverse to the bend is at most 4 times a thickness of the glass sheet and the straight sections of the shaped glass sheet are substantially flat. A process for the preparation of the shaped glass sheet comprises applying an electrically conductive material on a surface of a glass sheet to form a bend line, generating a graded temperature profile transverse the bend line, and then applying an electrical potential to the bend line. In another process, a width or thickness of a bend line is not uniform or a bend line is discontinuous in the longitudinal direction of the bend line, no particular temperature profile is required and, upon applying an electrical potential, arc discharge occurs along the bend line to melt the glass rapidly.

8 Claims, 10 Drawing Sheets

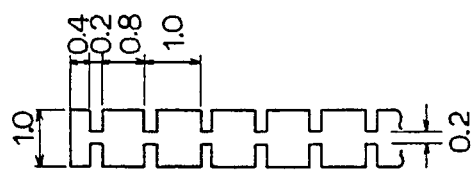
FIG. 3A
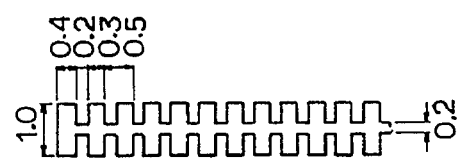
FIG. 3B
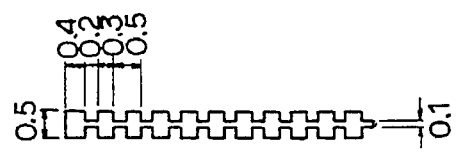
FIG. 3C
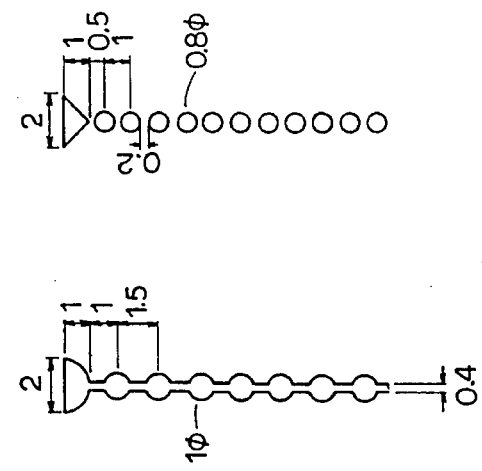
FIG. 3D
FIG. 3E
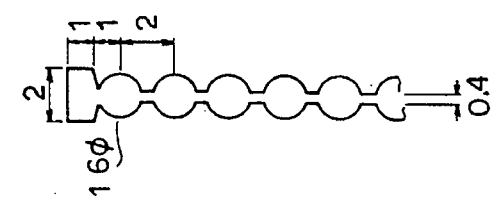
FIG. 3F
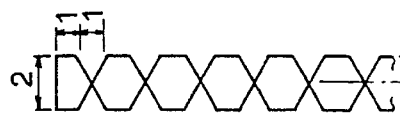
FIG. 3G
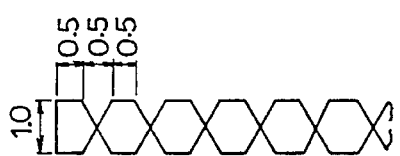
FIG. 3H
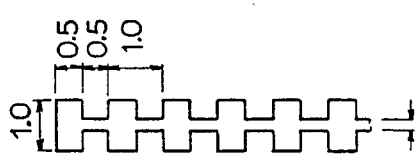
FIG. 3I
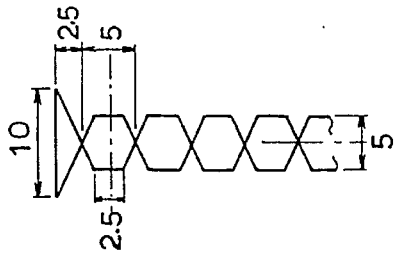
FIG. 3J
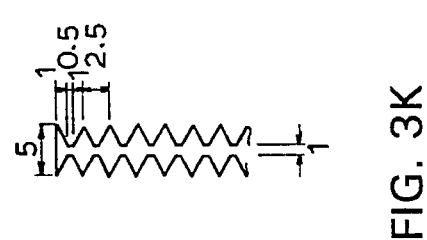
FIG. 3K Cross secion: I, I'; II, II'

SHAPED GLASS SHEET AND A PROCESS FOR THE PREPARATION THEREOF

FIELD OF THE INVENTION

The present invention relates to a shaped glass sheet, particularly, for use in buildings and general industries, more specifically a bent glass sheet composed of more than one plane parts with no seem line at a bend position, and a process for the preparation thereof. The invention also relates to a glass sheet structure composed of at least two bent glass sheets with no seem line at a bend position, where the glass sheets are positioned with a space to each other.

BACKGROUND OF THE INVENTION

Glass sheets are used in the exterior and interior of buildings and in general industries, for instance, in windows, show windows, wall materials, doors, partitions, display cases, water tanks and furniture. At a corner of a window, show window or display case, two glass plates are joint at a desired angle with a frame made of metal, wood or plastic, and the joining parts between the glass plates and the frame are bound with a calking material such as silicone rubber and a sealing material. However, appearance and seeing through are disturbed by the frame at a corner. In addition, a stainless steel frame increases costs.

Alternatively, an edge of a glass sheet is matched with an edge of another glass sheet without using a frame and the matched edges are adhered with a calking material such as silicone rubber and a sealing material. However, appearance and seeing through at a corner is not so improved even in such a structure. Further, the adhered corner is weak in strength. In addition, calking materials and sealing materials have limited weatherability. Therefore, the life of the adhered part is relatively short in general.

In order to remove the aforesaid drawbacks, a method is known where a glass sheet is heated and bent to have a bend of a desired angle. For instance, a usual float method glass sheet is placed horizontally on a frame which has a desired angle, the whole glass sheet is heated at about 500° to 580° C. and a position of the glass sheet to be bent is further heated locally to about 700° to 750° C., and then the glass sheet is molded on the frame by gravity or other external force to have a bend of a desired angle. However, a radius of curvature of the bend is relatively large. When a glass sheet is 4 mm thick for instance, a radius of curvature is at least 35 to 40 mm. Accordingly, a window, water tank, show window or display case with such a bend will largely distort an object. Further, because a relatively broad area near the bend of a glass sheet is disposed to a temperature above an annealing point, warpage is seen after bending in such a relatively broad area. Thus, straight parts have large distortion. FIG. 10 is an illustrative cross-sectional view of a bend area of a glass sheet which is formed in the aforesaid method. A radius of curvature at a bend, $B_1$, is approximately 10 times a thickness of the glass sheet, d. Parts, $AB_1$ and $AB_2$, are transitional areas with a length several times the thickness, d, between straight parts, $A_1$ and $A_2$ and a bend, $B_1$, and are distorted with bad optical properties. In addition, straight parts, $A_1$ and $A_2$, cannot maintain their original flatness as before the heat processing due to exposure to a high temperature, and have seeing through distortion and reflection distortion.

U.S. Pat. No. 3,762,903 discloses a process for bending a glass sheet to a relatively sharp angle, which comprises applying a layer of electrically conducting material to at least one surface of the sheet along a line about which it is desired to bend the sheet, applying an electrical potential across said line of a sufficient magnitude and for a time adequate to heat the sheet in the area immediately adjacent said line to a temperature above the bending point of the glass, and bending said sheet along said line to form said relatively sharp angle therein. More specifically, a glass sheet is placed on a bending mold such as a V-shaped frame. The glass sheet and the mold are heated to a temperature of 900° to 1,150° C. F(i.e., 482° to 621° C.) in a furnace. Upon the glass sheet reaching the desired overall temperature, an electrical potential is applied to the line of the electrically conducting material to heat the glass sheet immediately adjacent the line to a temperature above the bending temperature of the glass, for instance, above 1,200° F., i.e., 649° C. Then the glass sheet is bent by gravity into conformity with the bending mold. Typically, a potential of 45 volts maximum is applied in a current of 3 amperes for 15 minutes.

Windshields and backlights for automobiles are intended there and, therefore, the illustrative thickness of a glass sheet is rather small, i.e., 0.090 inch or 2.3 mm.

U.S. Pat. No. 3,762,904 discloses a process which is similar to the aforesaid process of U.S. Pat. No. 3,762,903, but is different in that a groove is formed in a surface of a glass sheet along a line about which it is desired to bend the glass sheet and an electrically conducting path is formed on an ungrooved surface of the glass sheet opposite the groove.

It is known to fit plural glass sheets in a window in dual or more structure for protection against cold, particularly, in cold districts. Such a dual or more structure of glass sheets is often used also in show windows, display cases and the like as an exterior for the same purpose as stated above. A corner part of such windows, show windows and display cases is constructed in such a way that two or more glass sheets are faced to one another in a desired space with spacers being inserted, and the spacer areas are sealed with a calking agent such as silicone rubber and a sealing agent. Then, a set of glass sheets thus sealed is bound with another set of glass sheets at a desired angle with a frame made of metal, wood or plastic. In this prior art construction, the sealing agent such as butyl rubber for sealing the gap between glass sheet edges has insufficient weatherability. Therefore, a care is needed to protect the sealed part from direct irradiation with lights. To this end, the frame has a sufficiently large depth, which however obstructs appearance and seeing through at a corner. Further, a stainless steel frame increases costs. To solve the aforesaid shortcomings, it may be thought to match an edge of a glass sheet with an edge of another glass sheet with no frame and to adhere the matched edges to each other with a calking material such as silicone rubber and a sealing agent. However, the sealing agent such as butyl rubber is directly irradiated with lights and then its life is too short for practical use.

SUMMARY OF THE INVENTION

The present invention provides a process for the preparation of a shaped glass sheet with a very sharp bend and substantially flat straight sections extending from the bend.

That is, the present invention is a process for the preparation of a shaped glass sheet having at least one linear bend and two straight sections extending from the bend, comprising applying an electrically conductive material to at least one surface of said glass sheet to form a linear bend line along a line about which it is desired to bend the glass sheet, heating areas of the glass sheet spaced at least 3 cm from the bend line transverse to the bend line to temperatures between 200° C. and 500° C. lower than a softening point of the glass sheet, heating areas of the glass sheet spaced less than 3 cm from the bend line transverse to the bend line to temperatures higher than said temperatures of the areas at least 3 cm from the bend line, but at least 50° C. lower than the softening point of the glass sheet, applying an electrical potential to the electrically conductive material of the bend line to heat the glass along the bend line to at least the softening point of the glass sheet and then bending the glass sheet along the bend line to form a shaped glass sheet having a sharp bend, wherein a radius of curvature of an outer circumference of the bend transverse to the bend is at most 4 times a thickness of the glass sheet and the straight sections of the shaped glass sheet are substantially flat.

In another process of the invention, a very narrow area of a glass sheet is heated to at least a softening point of glass in a very short period of time by a special means. Accordingly, two-dimensional stress caused in the glass sheet during heating and bending is so small that no particular care is needed for a temperature profile in the glass sheet.

That is, the present invention also provides a process for the preparation of a shaped glass sheet having at least one linear bend and two straight sections extending from the bend, comprising applying an electrically conductive material to at least one surface of the glass sheet to form a linear bend line along a line about which it is desired to bend the glass sheet, a width or thickness of said bend line being not uniform or the bend line being discontinuous in the longitudinal direction of the bend line, applying an electrical potential to the electrically conductive material of the bend line to cause arc discharge along the bend line to thereby heat the glass along the bend line to at least a softening temperature of the glass sheet and then bending the glass sheet along the bend line.

The present invention relates also to a shaped glass sheet thus produced. That is, the invention provides a shaped glass sheet having at least one linear bend and two straight sections extending from the bend, characterized in that a radius of curvature of an outer circumference of the bend transverse to the bend is at most 4 times a thickness of the glass sheet and the straight sections of the shaped glass sheet are substantially flat.

BRIEF DESCRIPTION OF THE DRAWINGS

FIG. 3 shows illustrative bend line patterns which are used to cause arc discharge along a bend line according to the process of the invention.

PREFERRED EMBODIMENTS OF THE INVENTION

Figure 1A:
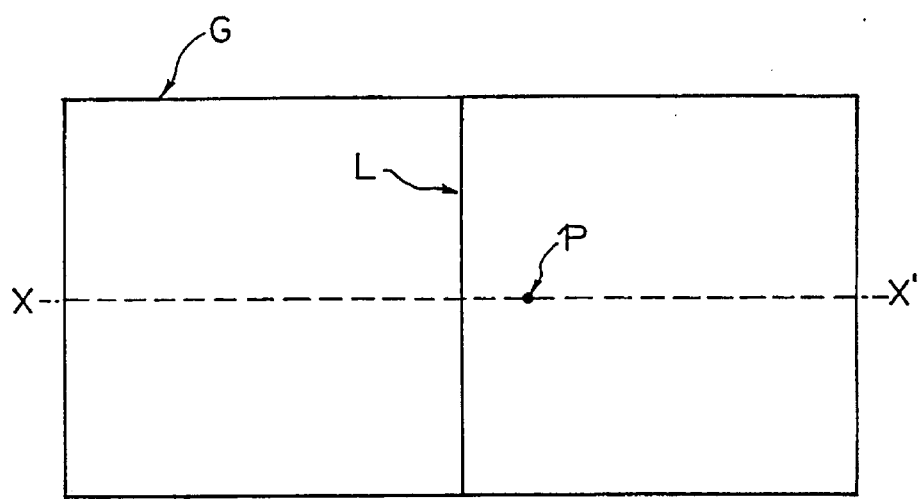
FIG. 1 is an example of a glass sheet temperature profile in accordance with the process of the invention.

In the process of the invention, a glass sheet is heated in a particular temperature profile which reduces two-dimensional internal stress caused by local heating with an electrical current, and prevents the glass sheet from cracking.

Of course, the internal stress can be reduced by overall heating of a glass sheet in a furnace at a rather high temperature, as described in U.S. Pat. No. 3,762,903. Then, it is hard to attain a very sharp bend as defined above. In addition, transitional areas take place between a bend and straight sections, where optical distortion is apparent. Further, flatness of the straight sections is damaged by such overall heating at a rather high temperature and by gravity which causes bending of the glass sheet. In this U.S. Patent, a rather thin glass sheet is mentioned. Even so, the aforesaid disadvantages are seen. Furthermore, the whole glass sheet and a frame supporting the glass sheet are heated together, which requires a large scale furnace and a lot of energy.

In the process of the invention, glass along the bend line (i.e., glass under and immediately adjacent the bend line) is heated to at least the softening point of the glass, preferably in a range of from the softening point to 140° C. plus the softening point. If the temperature exceeds this preferred upper limit, distortion will appear in straight sections near the bend of a bent glass sheet, and the heat economy of the process is also worse.

In the present invention, a softening point of a glass sheet means a temperature at which the viscosity of the glass is about $10^8$ poise, where the glass changes its shape due to its own weight. The softening point of a usual float method glass is about 740° C.

In a preferred embodiment of the process according to the invention, areas of a glass sheet spaced at most 5 cm from edges of the glass sheet facing the bend line are heated to temperatures ($T_1$) 400° C. to 500° C. lower than a softening point of the glass sheet, areas of the glass sheet at least 3 cm from the bend line transverse to the bend line and at least 5 cm from the edges of the glass sheet facing the bend line are heated to temperatures ($T_2$) higher than said temperatures $T_1$, and the areas spaced less than 3 cm from the bend line are heated to temperatures higher than $T_2$, but at least 100° C. lower than the softening point of the glass sheet, before the glass sheet is bent.

To attain the particular temperature profile according to the invention, the whole glass sheet is preferably heated by radiation and/or heat transfer, glass in areas near the bend line is subsequently heated by radiation, and then glass in an area immediately adjacent the bend line is electrically heated. The heat transfer heating of the whole glass sheet is preferably effected by putting glass in areas other than the area near the bend line between heating plates. For instance, flexible heaters for heat transfer are brought into contact with the both surfaces of the glass, on which a heat insulating material is put and pressed so as to attain close contact between the flexible heaters and the glass surfaces. The radiation heating of the glass in areas near the bend line is preferably conducted with a seeds heater or a halogen lamp. For instance, a rod shape seeds heater with a diameter of 15 mm is placed approximately 40 cm above and in parallel with the bend line.

Any known electrically conductive materials may be used to form the bend line. Preferred examples for them include conductive paints containing carbons such as graphite, metals such as silver, copper, nickel, chromium, palladium and platinum, oxides such as tin oxide, or silicon carbide; and metals or alloys such as iron-nickel-chromium alloy, copper-tin alloy and aluminium alloys. More specifically, for carbon type conductive paints, Bany Hyte F-525W-1, Nippon Kokuen Shoji Co., may be named. H 9100, Hokuriku Paint Co., and D-1230 (Kai), FuJikura Kasei Co., may be named for silver type conductive paints. Among these, any proper one may be selected depending upon the size and thickness of a glass sheet, electrical voltage used, electrical resistance of a bend line applied, adhesiveness to glass and coloring of glass due to diffusion of metallic ions. Carbon type ones are convenient, as control of electric power is easy to do and they may be completely removed in combustion by blowing oxygen after the heating step, e.g., in the bending step.

Pasty conductive paints may be applied on the surface of a glass sheet in a screen printing, anastatic printing, spraying or transferring process. Metals or alloys may be applied in a metal flame coating, CVD or pyrolytic process. In a metal flame coating method, a mask having a slit corresponding to a bend line is placed on a glass sheet. A metal as mentioned as a conductive material is melt by electrical arc or flame, which is blown through a nozzle by compressed air to coat the glass surface in a pattern of a bend line. In any one of the aforesaid methods, a conductive material may be applied precisely at a desired position and the applied bend line adheres closely to the surface of a glass sheet. However, the screen printing and the metal flame coating process are preferred for accuracy and convenience. The number of bend lines to be applied is same as the number of bends desired in a shaped glass sheet product, and is at least one in a glass sheet. A plurality of bend lines may be formed in parallel with one another or not in parallel.

The width of a bend line may vary depending upon the aforesaid factors, i.e., the size and thickness of a glass sheet, electrical voltage used, electrical resistance of a bend line, adhesiveness to glass and coloring of glass due to diffusion of metallic ions, but is preferably 0.3 to 3 times, preferably 0.5 to 1.5 times, the thickness of a glass sheet in a straight section. If the width of the bend line is more than 3 times the thickness of a glass sheet in a straight section, a too wide range of the glass sheet is heated around its softening point, so that a bend obtained will not be sharp enough. Meanwhile, if the width is less than three-tenths of the thickness of a glass sheet, sufficient heating is not attained and the thickness of a bend obtained will be too small. The thickness of a bend line layer may vary depending upon a type of the electrically conductive material and a method of applying the bend line, and should be such that glass is constantly heated to a predetermined temperature in a predetermined period of time. The thickness is preferably one-tenth to several hundreds μm, and particularly 10 to 100 μm in screen printing and 30 to 300 μm in flame coating.

A bend line may be applied on a surface of a glass sheet, both surfaces, one surface and two end faces, or in a loop shape connecting both surfaces and two end faces. For a rather thin glass sheet, a bend line is usually applied only on the surface which will become an outer circumference of a bend. For a thick glass sheet, it is preferred to apply a bend line on both surfaces. When dielectric heating is adopted as will be described below, a bend line in a continuous loop shape is required.

The glass sheet to be bent in the invention may be those used in buildings or general industries. However, it is characteristic of the process of the invention that a thick glass sheet with a thickness of 3 mm or more can be bent with a very sharp bend and flat straight sections. The glass sheet to be bent may be produced in any known methods. However, preferred are float method glass sheets which are formed on molten tin. The thickness, shape and size of the glass sheet are not limited and may be decided for particular purposes. Composition of the glass is not limited, either. Glass sheets having different softening points may be used, such as soda lime glass, borosilicate glass and high strength crystallized glass. Various types of glass sheets may be used, such as general purpose glass sheets, polished glass sheets and cut glass sheets. Glass sheets may be surface-treated, for instance, by thermic rays reflection coating, non-reflection coating, printing of a particular pattern or surface etching.

An electrical potential is applied to a bend line, preferably, in any of the following manners. Solid terminals of a proper shape are brought into contact with a bend line at edges of a glass sheet, to which a current is applied, or electrically conductive high temperature gas flame generating lithium ions or the like is brought into contact with a bend line at edges of a glass sheet, through which flame a current is applied. Alternatively, a bend line is formed in a loop shape, to which a high frequency electric source is connected for dielectric heating. The electric source used in the aforesaid manners may be industrial alternating electric source of 50 or 60 Hz, high frequency electric source of 100 KHz to 50 MHz or direct current electric sources. Any of the aforesaid types of electric sources may be used in the manner of using solid terminals. High frequency electric sources are preferred for the manner of using conductive high temperature gas flame. Dielectric heating allows only the use of high frequency electric sources. Besides the manner of applying a current, the size of a glass sheet is also taken into consideration in selection of the type of an electric source used.

Control of the aforesaid electric heating is conducted with consideration of a potential, a current, period of time of turning on electricity, a thickness and size of a glass sheet, a width of a bend line, a temperature profile in the whole glass sheet, a speed of bending a glass sheet and a final angle of a bend. Preferably, a current and period of time of turning on electricity are controlled. Many controlling factors are involved as mentioned above and, further, a temperature profile in the whole glass sheet changes with time. Accordingly, it is preferred to control the temperature by a computer. In general, turning on electricity for 30 seconds to 5 minutes, particularly 1 to 3 minutes, allows sufficient heating, i.e., tens to hundreds watts per 10 cm of a bend line.

Figure 1B:
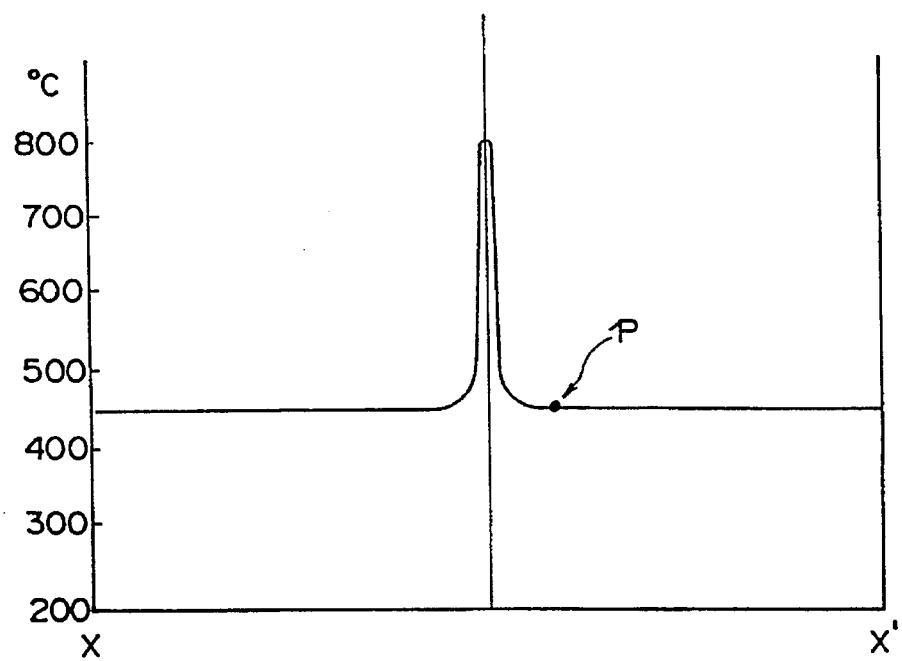

FIG. 1 shows an example of a temperature profile in a glass sheet which is attained according to the invention. Glass sheet, G, is 800 mm long, 400 mm wide and 4 mm thick. Its softening point is 740° C. A bend line, L, is drawn at the center of the glass sheet in the longitudinal direction. In the lower figure, a temperature profile along line XX' shown in the upper figure is depicted, where the glass is heated according to the invention. Point, p, in glass sheet G is marked also in the temperature profile. In the temperature profile, the area of about 6 mm or less from the bend inc is about 800° C. In the areas outside the aforesaid area, which areas were heated by radiation, temperatures decrease abruptly in a range of 25 mm from bend line L. At point p, which is 100 mm far from bend line L, the temperature is about 450° C., which temperature prevails almost constantly up to the edges. Thus, the temperature profile is made very sharp near bend line L in order to maintain the flatness in areas adjacent the bend line in the invention. Nevertheless, cracking of a glass sheet can be prevented by controlling the temperature profile of the whole glass sheet properly as above.

In addition to the temperature profile transverse to the bend line, it is preferred to attain a predetermined temperature profile also in the direction parallel to the bend line. That is, in each temperature profile in each line parallel to the bend line and transversely spaced 10 cm from the bend line, the temperature of an area near the edge is made higher than the temperature of a central position by 30° to 150° C., more preferably by 50 to 100° C. By this temperature profile, breakage of a glass sheet due to two-dimensional internal stress is more suitably prevented. Such a predetermined temperature profile parallel to the bend line may be attained by radiation heating and/or heat transfer heating for heating areas near the edges.

Figure 2A:
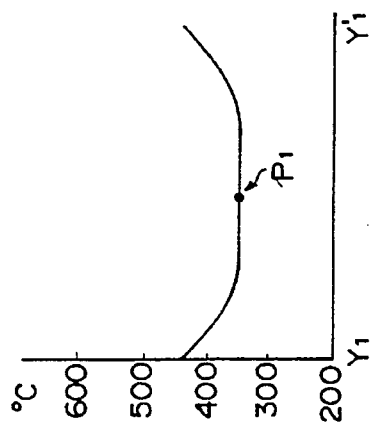
FIG. 2 is another example of a glass sheet temperature profile in accordance with the process of the invention.
Figure 2B:
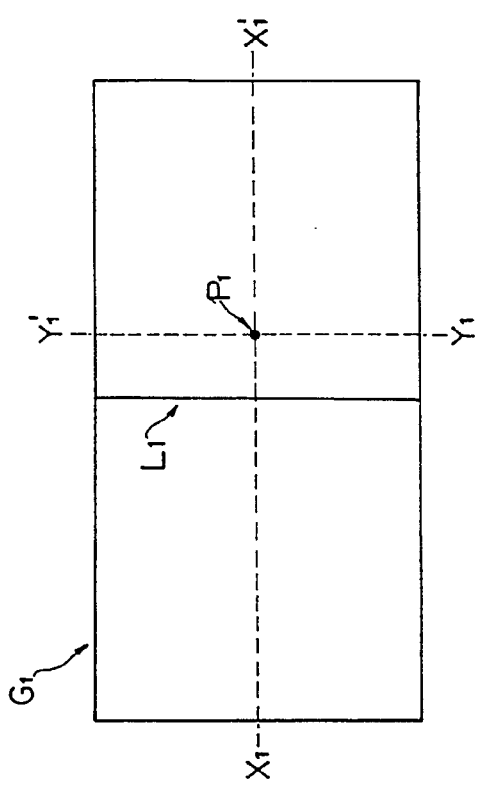
Figure 2C:
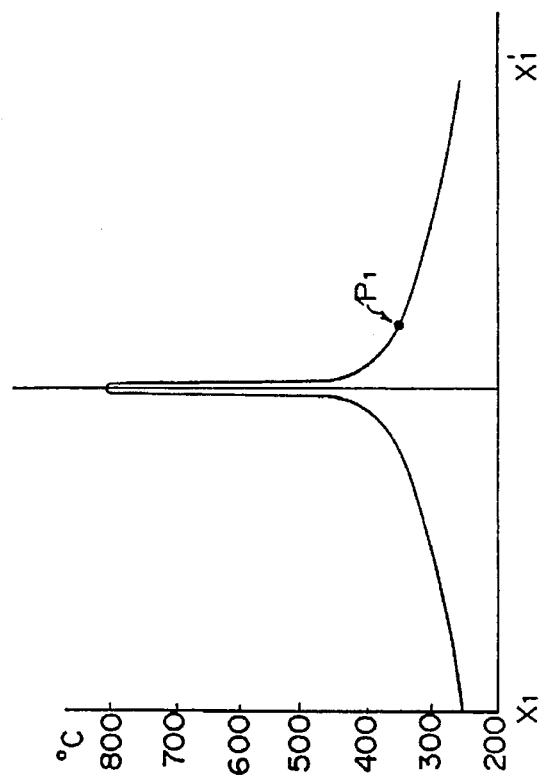
Figure 4A:
FIG. 4 shows enlarged cross-sectional views of parts of glass sheets near grooves in accordance with the invention.
Figure 4H:
Figure 4B:
Figure 4I:
Figure 4C:
Figure 4J:
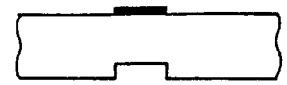
Figure 4D:
Figure 4K:
Figure 4E:
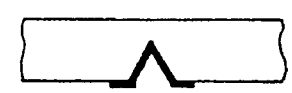
Figure 4L:
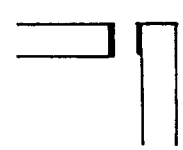
Figure 4F:
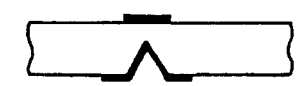
Figure 4M:
Figure 4G:

FIG. 2 shows an example of temperature profiles in the case where a temperature curve in a direction parallel to a bend line is made uneven. Glass sheet, $G_1$, is the same as that in FIG. 1. A temperature profile along line $X_1X_1'$ and a temperature profile along line $Y_1Y_1'$ for a glass sheet heated according to the invention are illustrated in FIG. 2. Position, $P_1$, in glass sheet $G_1$ is shown also in the two temperature profiles. In the temperature profile along line $X_1X_1'$, areas spaced about 6 mm from bend line $L_1$ on the right and left sides are at approximately 800° C., and temperatures decrease relatively moderately with a location moving toward the edges. At point $P_1$, which is about 100 mm far from bend line $L_1$, the temperature is approximately 350° C. Temperatures decrease more moderately with a location moving toward the edges, and are finally about 250° C. at the edges. Meanwhile, in the temperature profile along line $Y_1Y_1'$, the temperatures in areas near the edges are made higher than the temperature at a central position, which is important for preventing a glass sheet from cracking due to two-dimensional stress. That is, although the temperature profile along line $X_1X_1'$ is made very steep near bend line $L_1$ to maintain the flatness of the glass sheet near the bend line according to the invention, cracking of the glass sheet is preferably prevented by properly controlling temperature profiles in the whole glass sheet. Less energy is required to heat a glass sheet in the embodiment of FIG. 2 than in FIG. 1.

The heating is usually conducted in air, but this is not restrictive.

To bend a heated glass sheet along a bend line at a predetermined angle according to the invention, a glass sheet-holding mechanism is used. A bending speed, a bending force and a final bend angle are precisely controlled by the glass sheet-holding mechanism, so that generation of cracks at the bend area is prevented and a predetermined shape of the cross section and a predetermined thickness at the bend are attained. Preferably, the glass sheet-holding mechanism is provided with a radiation heating means and/or a heat transfer heating means which are used to heat straight sections of a glass sheet. For instance, flexible heaters for heat transfer heating are brought into contact with both surfaces of a glass sheet, on which a heat-insulating material is placed. The glass sheet-holding mechanism has plates attached to arms, by which the glass sheet is clamped via the insulating material. The arms are moved by power to bend the glass sheet at a predetermined angle. An internal angle of two adjacent straight sections is preferably made 60 to 160 degrees. The bending operations can be completed in a very short period of time, preferably in 1 to 5 minutes in general.

The electrically conductive material of the bend line is usually removed after the heating and shaping steps. Most of the components of the electrically conductive material burn or scatter gradually during the heating, and almost no conductive material remains after the shaping in some cases. From this point of view, carbon type conductive paints are preferred. Some conductive materials do not completely burn to disappear, but remain on the glass surface, depending upon types of the conductive materials and thickness of their layer. In such a case, the remaining material can be removed by blowing oxygen after the heating and shaping steps to completely burn it, or by mechanical or chemical treatment to the glass cooled, such as polishing. When a metal type conductive material is used, the metallic component, usually, diffuses into the glass. When it is desired to leave a line from a conductive material in a completed shaped glass sheet for a design purpose, a bend line may be formed with a conductive material having a particular composition which will offer a desired color tone.

The shaped glass may be after-treated as usual. For instance, it may be cooled slowly or rapidly to obtain a slow-cooled glass or tempered or highly tempered glass. It may be subjected to surface treatment such as thermic rays reflection coating, non-reflection coating, printing of a particular pattern, and surface etching.

An improvement has now been found, which makes it possible to heat glass along a bend line to at least a softening point of the glass in a much shorter period of time and, also, to minimize two-dimensional internal stress generating in a whole glass sheet during heating of a bend line zone.

This method comprises applying an electrically conductive material to at least one surface of the glass sheet to form a linear bend line along a line about which it is desired to bend the glass sheet, a width or thickness of said bend line being not uniform or the bend line being discontinuous in the longitudinal direction of the bend line, applying an electrically potential to the electrically conductive material of the bend line to cause arc discharge along the bend line to thereby heat the glass along the bend line to at least a softening temperature of the glass sheet and then bending the glass sheet along the bend line.

In a bend line of the aforesaid form, electrical resistance is larger in points where the width or thickness of the bend line is smaller or where the bend line is discontinued (hereinafter referred to generically as "narrower points"). Accordingly, when a high electrical potential is applied to the bend line, arc discharge takes place continuously, stepping over the narrower points. Then, the temperature at these points becomes high enough to melt the glass, resulting in formation of melt spots. The electrically conductive material burns, volatilizes or diffuses into glass at a high temperature. Accordingly, the amount of the electrically conductive material decreases in places where a broader or thicker part of the bend line adjoins the melt spots, as a result of which arc discharge occurs also there, and finally melt spots are connected with one another to form a melt line. In the melt line, the temperature is 700° C. or higher, and sodium ions generate so that the glass has better electrical conductivity and electricity moves on the surface part of the glass. With the further lapse of time, the conductive material in the bend line disappears further and arc discharge on the glass surface comes to cease. In addition, the temperature increase in the glass surface reaches the top due to heat dissipation. As the results, the temperature in points immediately below the melt line becomes higher than that on the glass surface, and the electricity then moves inside the glass immediately below the melt line where the temperature is higher and electrical conductivity is higher. Accordingly, the inside of the glass immediately below the melt line is heated to melt by Joule heating. With repetition of the aforesaid phenomena, electricity will move more inside the glass to effect heating there. As the results, it is believed that the electrical current concentrates in a line central in the direction of the thickness of the glass and perpendicularly below the bend line and the glass has a temperature profile having a peak at the central position in the direction of thickness. According to visual observation, glass melts very rapidly, starting at the surface and reaching the center. Setting aside detailed theory, the glass is melt very locally along the bend line through the whole thickness of the glass sheet. This is completed in a very short period of time, i.e., several seconds to 30 seconds. With a glass sheet of 5 mm thick, a period of 5 seconds is enough, and the glass in the area of a bend line even hangs down by its own weight in 10 seconds.

Therefore, heat transfer toward straight sections of a glass sheet is less, and the temperature in areas near a bend line do not reach the softening point. Bending of a glass sheet thus heated looks like welding of two glass sheets. Accordingly, it is possible to produce a shaped glass sheet with a very sharp bend and very flat straight sections which extend up to near the bend.

FIG. 3 shows examples of patterns of bend lines used for arc discharge in the process of the invention. The unit of the size indicated in the drawing is millimeter. A width of a bend line at its widest point does not depend much upon a thickness of a glass sheet, and is preferably 0.5 to 5 mm, particularly 1 to 3 mm. If the largest width is less than 0.5 mm, heating with sufficient electric energy cannot be effected. Meanwhile, if it exceeds 5 mm, a too wide range of a glass sheet is heated around its softening point, so that a bend will not be sharp sufficiently. The narrowest width in each bend line pattern is preferably 1 mm or less, particularly 0.5 mm or less. If the narrowest width exceeds 1 mm, arc discharge is difficult to occur. A bend line may be discontinuous, preferably, with gaps of 0.1 to 2 mm, particularly 0.5 to 1.0 mm. If the gap exceeds 2 mm, arc discharge is difficult to occur.

A bend line is composed of repeated patterns which are defined by the widest points and the narrowest points or by the gaps, and each pattern is preferably 0.3 to 10 mm long, more preferably 1 to 3 mm long, in the longitudinal direction of the bend line. If it exceeds 10 mm, a time period required for heating is too long. Meanwhile, if it is less than 0.3 mm, it is difficult to precisely form a bend line in a predetermined shape. The thickness of the bend line may vary depending upon a type of the electrically conductive material and a method of applying the bend line, and should be such that glass is constantly heated to a predetermined temperature in a predetermined period of time. The thickness is preferably one-tenth to several hundreds µm, and particularly 10 to 100 µm in screen printing and 30 to 300 µm in flame coating.

A bend line may be such that a thickness of a bend line layer varies in the longitudinal direction. The largest thickness is preferably 10 to 50 µm and the smallest thickness is preferably 5 to 15 µm. A width of such a bend line is preferably 0.5 to 5 mm. A pattern composed of a thicker part and a thiner part is preferably 0.3 to 10 mm in length. For instance, a bend line may have a width of 1.0 mm, the largest thickness of 30 µm, the smallest thickness of 10 µm and a length of a pattern of 1 mm.

A manner of applying an electrically conductive material to a surface of a glass sheet to form a bend line, a manner of applying an electrical potential to the electrically conductive material of the bend line and a manner of bending the glass sheet may be same as described above, but the electrical potential here must be sufficiently high to cause arc discharge, preferably several thousands volts to twenty thousands volts with a current of, preferably, 0.5 to 2 amperes.

Control of the electrical heating is conducted with consideration of a thickness and a size of a glass sheet, a largest width and a smallest width or a gap size of a bend line, a speed of bending a glass sheet and a final angle of a bend. Preferably, a current and a period of time of turning on electricity are controlled by a computer. In general, turning on electricity for several seconds to 30 seconds allows sufficient heating, i.e. tens to hundreds watts per 10 cm of a bend line. Thus, the heating time is shortened to from approximately one half to one-twentieth of that needed in the aforesaid embodiment where a temperature profile is controlled. For instance, heating time of 5 seconds is enough for a glass sheet of 3 mm thick. This process with arc discharge is effective particularly for thicker glass sheets.

Heating is effected in a very narrow band of a glass sheet in this process with arc discharge. Therefore, two-dimensional stress caused is small and lasts for only a short period of time, so that a danger for a glass sheet to break is small. This will be easily understood by considering an imaginary case where a glass sheet is melt in a band of an infenitesimal width and an area nearby is at normal temperature, then the glass sheet will never break.

It is preferred in the process of the invention using arc discharge that a whole glass sheet is heated approximately uniformly at a temperature below an annealing point of glass, more preferably 0° to 200° C. lower, particularly 50° to 100° C. lower,than an annealing point in advance of the heating of a bend line area. Two-dimensional internal stress caused in a glass sheet in local heating with arc discharge is made very small with such a convenient advance uniform heating at a relatively low temperature. Thus, breakage of a glass sheet is safely prevented. An annealing point of glass generally means a temperature at which a viscosity of glass is approximately $10^{13}$ poise. Any known method may be used for the uniform heating. For instance, a whole glass sheet is put in an electric furnace controlled at a predetermined temperature, which is easy and practical.

In the process of the invention with arc discharge, it is preferred that a groove is formed in a surface of the glass sheet along a line about which it is desired to bend the glass sheet, and the glass sheet is bent inwards toward the groove side of the glass sheet to thereby fuse the glass defining the groove together.

A bend line is formed with an electrically conductive material in or near a groove. It is preferred that the electrically conductive material to form the bend line is applied in at least area of the follow locations: (1) on surfaces of glass defining the groove, (2) on an area immediately adjacent the groove, and (3) on the surface of the glass sheet opposite the groove. A means of forming a groove in a glass sheet is known. For instance, a V cut machine for glass plates supplied from Suzuki Shokai Ltd. may be used. The number of grooves is same as that of bends desired in a shaped glass sheet product, and at least one in a glass sheet. When a plurality of grooves are formed, they may be parallel to one another or not parallel. Profile of a groove may be triangular or square, but preferably triangular. A size of the profile may be properly decided in consideration of a thickness of a glass sheet, an angle of a bend of a shaped glass sheet and so on. In general, a depth of a groove is decided by a desired radius of curvature of the bend. It is preferably one fifth to one half of a thickness of a glass sheet. A bottom angle of a triangular groove is preferably same as an angle of a bend of a shaped glass sheet. To perpendicularly bend a glass sheet with a thickness of 5.0 mm, an illustrative groove has a triangular profile with a right bottom angle and a depth of 2.0 mm. The groove is formed generally only on a surface toward which a glass sheet is bent.

FIG. 4 is enlarged cross-sectional views of parts of glass sheets near grooves and shows where a bend line is applied. Black thick lines in the drawing show cross sections of bend line layers, but their scale is unreal for convenience of drawing. As shown in FIG. 4, (A) for instance, a bend line is applied on surfaces of glass defining a groove. When an electrical potential is applied to the bend line, arc discharge occurs so that the glass defining the groove is melted very locally and, upon the glass sheet being bent, fused together. Accordingly, a product has a large strength at a bend.

In other embodiments, bend lines may be applied on right and left surfaces of a glass sheet immediately adjacent a groove as shown in (B), on a glass sheet surface opposite a groove as in (C), or both as in (D).

In further other embodiments, bend lines may be applied on surfaces of glass defining a groove and on surfaces of a glass sheet immediately adjacent the groove as in (E), on surfaces of glass defining a groove, on surfaces of a glass sheet immediately adjacent the groove and on a glass sheet surface opposite the groove as in (F), or on surfaces of glass defining a groove and a glass sheet surface opposite the groove as in (G). In these embodiment, glass on the surfaces of a groove and glass in a part to be bent are rapidly heated and therefore a radius of curvature of a bend can be smaller, which is particularly desired.

A bend line may be applied at a bottom of a groove as in (H), or in another groove formed on a surface opposite a first groove as in (I). In either embodiment, a relatively thick glass sheet may be used, and the softened and melted part is very narrow. In the embodiment (I), the groove for a bend line is formed on the surface which is stretched during bending and, upon bending, will be flatened to disappear.

In the above, grooves with a triangular profile are illustrated, but this not restrictive. In (A) through (I), grooves may have a square profile. In (J) which corresponds to (C), the cut-off area in a groove is larger. This is efficient, particularly, for a thick glass sheet when a radius of curvature of a bend is made less than a thickness of a glass sheet. However, it is advisable to decide a shape and size of a groove in consideration with an angle of a bend so that no interstice remains at the groove position after bending.

A width of a bend line depends upon a place of a bend line, a shape and size of a groove, a thickness of a glass sheet, an angle of a bend, an electrical potential and a shape of a bend line. In (A), (E), (F) or (G) where a bend line is applied on the surface of a groove, a bend line may be applied on the whole surface of a groove or partially. When a glass sheet is relatively thick, a bend line may be applied in a bottom of a groove, so that a softened and melted part will be very narrow, but, with sufficient heating as in (H). In (B) where a bend line is applied in areas immediately adjacent a groove, or (C) and (J) where a bend line is applied on the surface of a glass sheet opposite a groove, the width of a bend line is preferably 0.2 to 3 times a thickness of a glass sheet at a position of the groove, particularly one half to equal to that. In (D), (F) and (G) where more than one bend lines are applied, even if the width of each bend line is smaller than that mentioned above, sufficient heating can be effected.

The shaped glass sheet produced in the process of the invention has a very sharp bend and very flat straight sections. This is particularly true in the process using arc discharge heating.

That is, the present invention also provides a shaped glass sheet having at least one linear bend and two straight sections extending from the bend, characterized in that a radius of curvature of an outer circumference of the bend transverse to the bend is at most 4 times, preferably at most twice, a thickness of the glass sheet and the straight sections of the shaped glass sheet are substantially flat. If the radius of curvature is more than 4 times a thickness of a glass sheet in straight section, a bend distorts a substance which is seen through there. In an extreme case, a substance is enlarged by a bend. There may be a transitional area between a bend and a straight section, in which area the glass sheet is slightly warped to loose flatness. A width of the transitional area is preferably at most twice a thickness of a glass sheet, particularly not more than that. If the width exceeds twice the thickness, a straight section near a bend distorts a substance which is seen through there. In the bent glass sheet of the invention, the straight sections are substantially flat. In the case of float method glass sheets for instance, its original flatness before the present process being applied is maintained as such.

Figure 5:
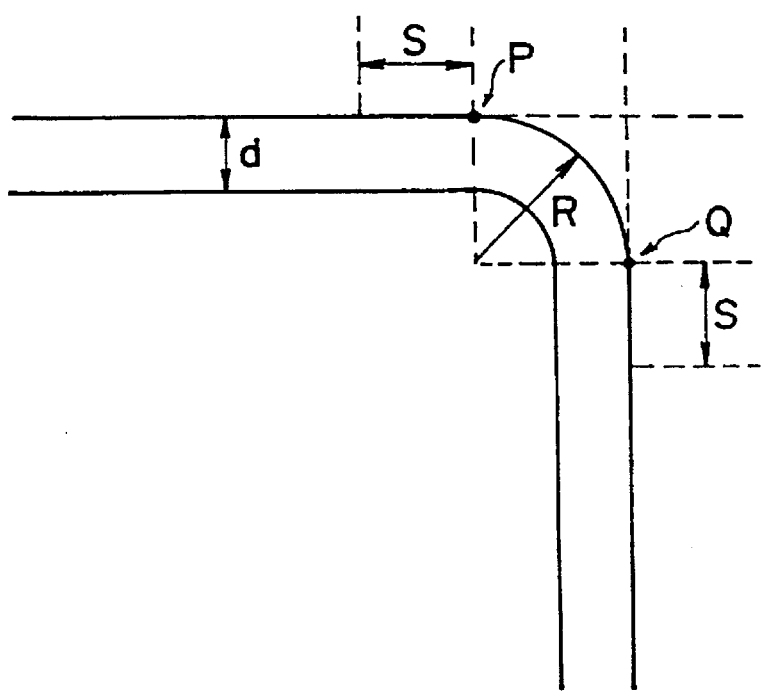
FIG. 5 is a conceptual cross-sectional view of a bend part of a shaped glass sheet according to the invention.
Figure 6A:
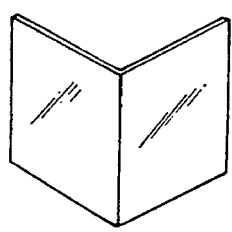
FIG. 6 is schematic views of examples of the shaped glass sheet according to the invention.
Figure 6B:
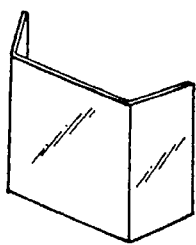
Figure 6C:
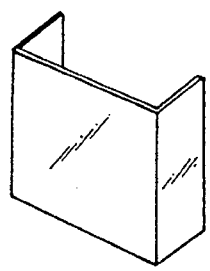
Figure 6D:
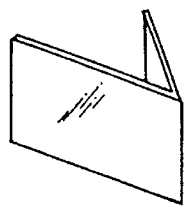
Figure 6E:
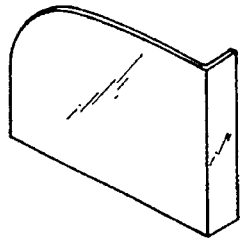
Figure 6F:
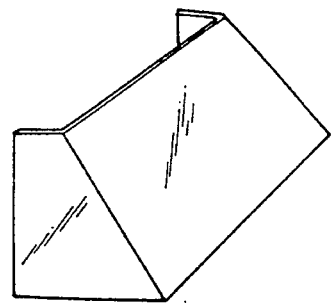
Figure 6G:
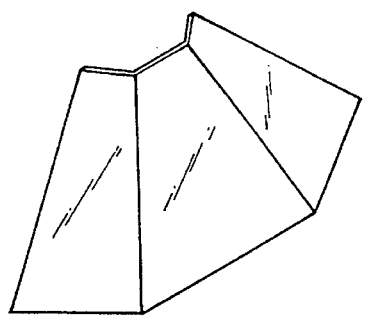
Figure 6H:
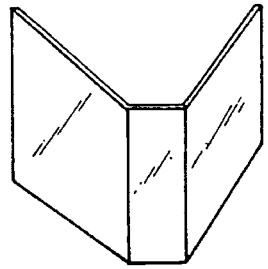
Figure 6I:
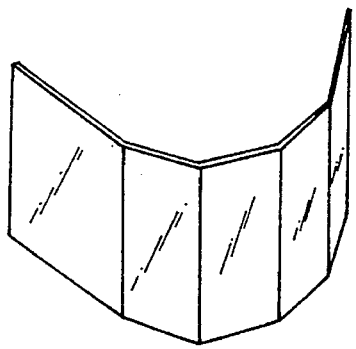
Figure 10:
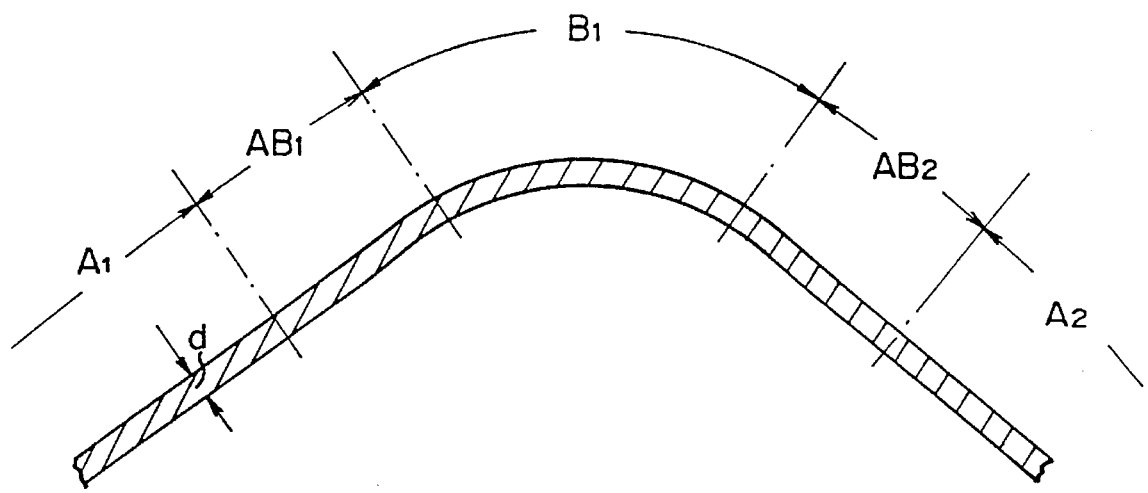
FIG. 10 is a conceptual cross-sectional view of a bend part of a bent glass sheet produced in the prior art.
Figure 11:
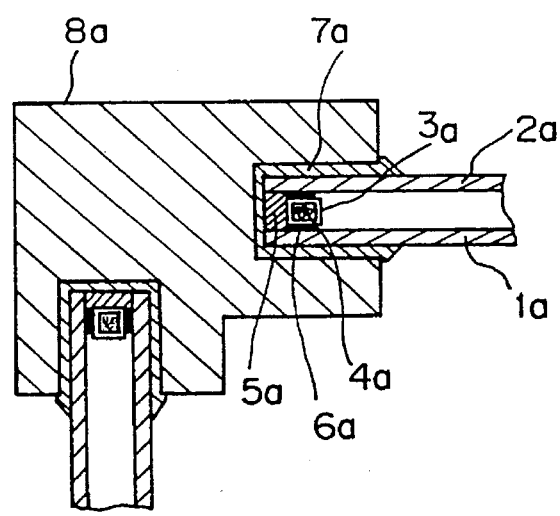
FIG. 11 is a cross-sectional view of a glass sheet structure which is unified with a frame.

FIG. 5 is a conceptual cross-sectional view of a bend part of a shaped glass sheet of the invention. R indicated in the drawing is the radius of curvature defined in the invention. Points P and Q are points where a curved surface starts. Outsides points P and Q in a shaped glass sheet according to the invention there may be transitional area S which is seemingly flat, but warps slightly to loose flatness and has relatively bad optical properties. In a glass sheet having a bend in the prior art, a radius of curvature is remarkably large as shown in FIG. 10, a boarder between a flat part and a bend is unclear and there is a long transitional area between a flat part and a bend, which warps slightly to loose flatness. This is apparently different from the glass sheet of the invention.

The shaped glass sheet of the invention has at least one corner, and includes those shown in FIG. 6.

A glass sheet structure may be constructed with the two or more shaped glass sheets of the invention all having approximately the same radius of curvature. Such a glass sheet structure is composed of at least two glass sheets, a spacer which defines a space between the glass sheets, and a means of filling a gap between the glass sheets and the spacer, each of said sheets being a shaped glass sheet having at least one linear bend and two straight sections extending from the bend, characterized in that a radius of curvature of an outer circumference of the bend transverse to the bend is at most 4 times a thickness of the glass sheet and the straight sections of the shaped glass sheet are substantially flat and the sheets having approximately the same radii of curvature.

Because the shaped glass sheets with a very sharp bend and very flat straight sections are used in the structure, the structure such as a window, a show window or a display case does not distort a substance which is seen through there. Thus, the structure has excellent properties which are not expected in the prior art. The aforesaid process of the invention makes it possible to produce Just the same shape of bent glass sheets with high reproductivity. Accordingly, the structure of glass sheets mentioned above is also produced with high reproductivity as compared with the prior art.

In the glass sheet structure, the glass sheets are each fixed, preferably, in substantially parallel with each other. A space between glass sheets depends upon use, but is preferably 3 to 60 mm, more preferably 3 to 30 mm, particularly 4 to 24 mm. The space between glass sheets means a distance between the straight sections of glass sheets which face to each other.

Figure 7A:
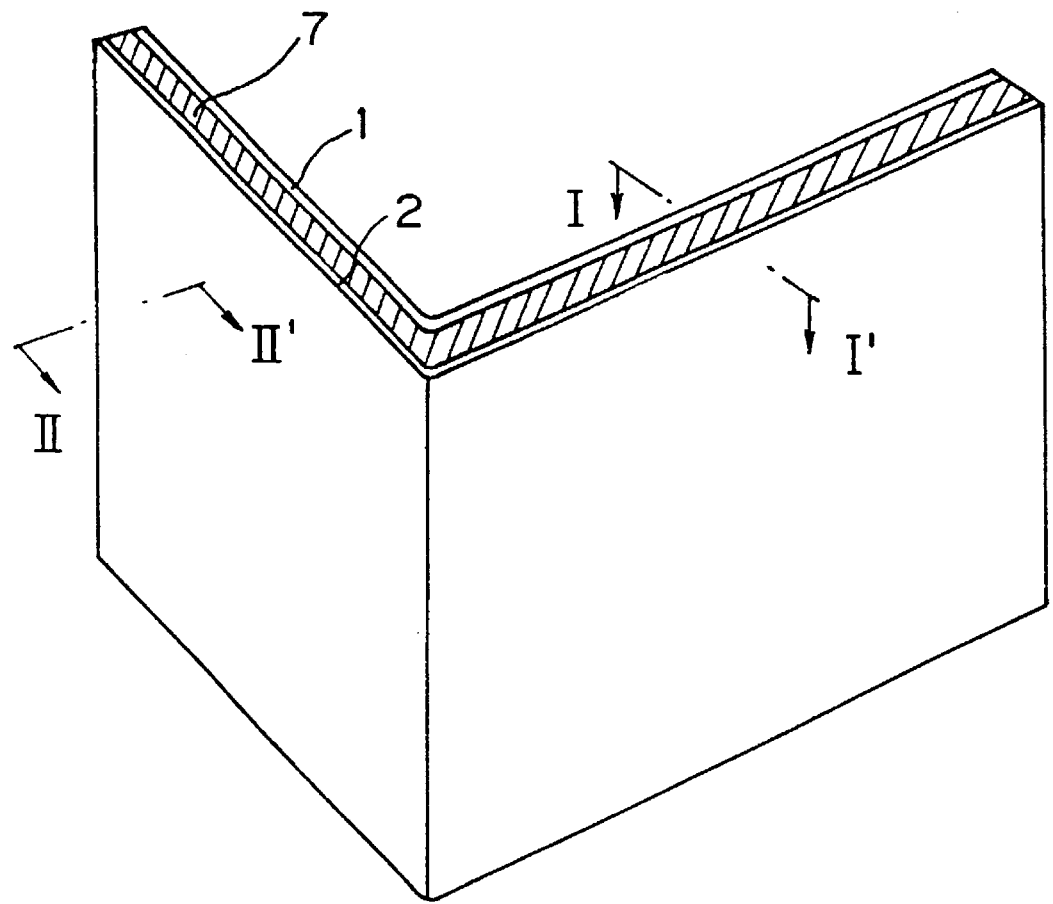
FIG. 7 is a schematic view of a glass sheet structure of the invention.
Figure 7B:
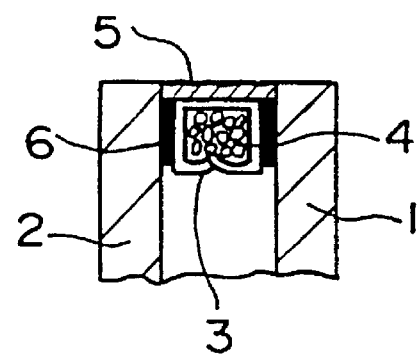

FIG. 7 is a schematic view of a glass sheet structure of the invention. A cross-sectional view is also shown in the lower part of the drawing, which shows a cross section of the glass sheet structure at line I–I' or II–II' in the schematic view. Inner glass sheet, 1, and Outer glass sheet, 2, both have a thickness of 4 mm and are spaced with a space of 6 mm between their straight sections.

In the outer glass sheet, a side parallel to the linear bend is 400 mm long, and sides perpendicular to the bend are both 400 mm long. The outer glass sheet and the inner glass sheet are spaced with a spacer, 3, which has a width enough to secure a space between the glass sheets and is disposed along the circumference of the glass sheets. The spacer may be anything as long as it can secure the glass sheets with a predetermined space, but is preferably a hollow square pillar made of metal such as aluminium, soft iron and stainless steel or plastics, as shown in the cross-sectional view. Also as shown in the cross-sectional view, two glass sheets are sealed with a sealing material such as butyl rubber, 6, and a calking material such as silicone rubber and polysulfurized synthetic rubber, 5, via the spacer. Any other means may be used to fill a gap between the glass sheets and the spacer. For instance, use is made of a unit which has a binding member to mechanically fix glass sheets directly to a spacer. It is preferred that the inside of the spacer, 3, is completely or partly filled with a drying agent, 4, such as silica gel and molecular sieve. The sealing agent, 6, is to prevent moisture from penetrating into the space between the sealed sheets and, thus, to prevent the glass from clouding. The drying agent, 4, also absorbs a trace moisture which penetrated into the sealed space of the glass sheets during assembling. The glass sheet structure of the invention may be installed by setting its sealed circumference in a frame such as a window frame which is subsequently fixed.

The invention will be further explained with reference to the following Examples.

EXAMPLE 1

A float method rectangular glass sheet (soda lime glass, softening point 740° C.) was provided, which was 800 mm long, 400 mm wide and 4 mm thick. A bend line of 2 mm wide and 20 μm thick was applied on one surface and both side faces of the glass sheet at the center of the longitudinal direction in the transverse direction with a silver type electrically conductive material, D-1230 (Kai), Fujikura Kasei Co., in screen printing. Solid terminals were connected to the bend line on the side faces. Then, a rod shape seeds heater of 15 mm in diameter was placed 40 mm above the bend line in parallel to the bend line. Also, heat transfer heating units comprising flexible heaters were placed on the whole surfaces of the glass sheet excerpt areas spaced at most 50 mm from the bend line transverse to the bend line. This heat transfer heating units clamped the glass sheets on their surfaces to function as a glass sheet-holding mechanism.

First, heat transfer heating was started to heat the whole glass sheet to 450° C. Then, irradiation heating to an area near the bend line was started, followed by applying a current of 50 Hz, AC 38 volts to the bend line for 2 minutes to heat the glass along the bend line to 800° C. The glass sheet reached a temperature profile as shown in FIG. 1. Then, the glass sheet was bent by the glass sheet-holding mechanism in about one minute until the two straight sections were at a right angle. After the bending, the shaped glass sheet was annealed.

A radius of curvature of the outer circumference of the bend transverse to the bend in the shaped glass sheet thus produced was 5 mm, i.e., 1.2 times the thickness of the glass sheet, in the straight sections. There was seen almost no transitional area in which the sheet would slightly warp and loose flatness. The straight sections of the shaped glass sheet maintained its original flatness as in the starting float method glass sheet, and exhibited absolutely no increase in optical seeing-through distortion and reflection distortion.

EXAMPLE 2

A float method square glass sheet (soda lime glass, softening point 740° C., annealing point 540° C.) of a size of 1,000 mm×1,000 mm and a thickness of 5 mm was provided. A bend line with the pattern indicated in FIG. 3, I, was applied with a constant thickness of 20 μm in screen printing with a carbon type electrically conductive material (Bany Hyte F-525W-1, Nippon Kokuen Shoji Co.) in a center of a surface of the glass sheet. Solid terminals were contacted to the bend line at the end faces.

Figure 8:
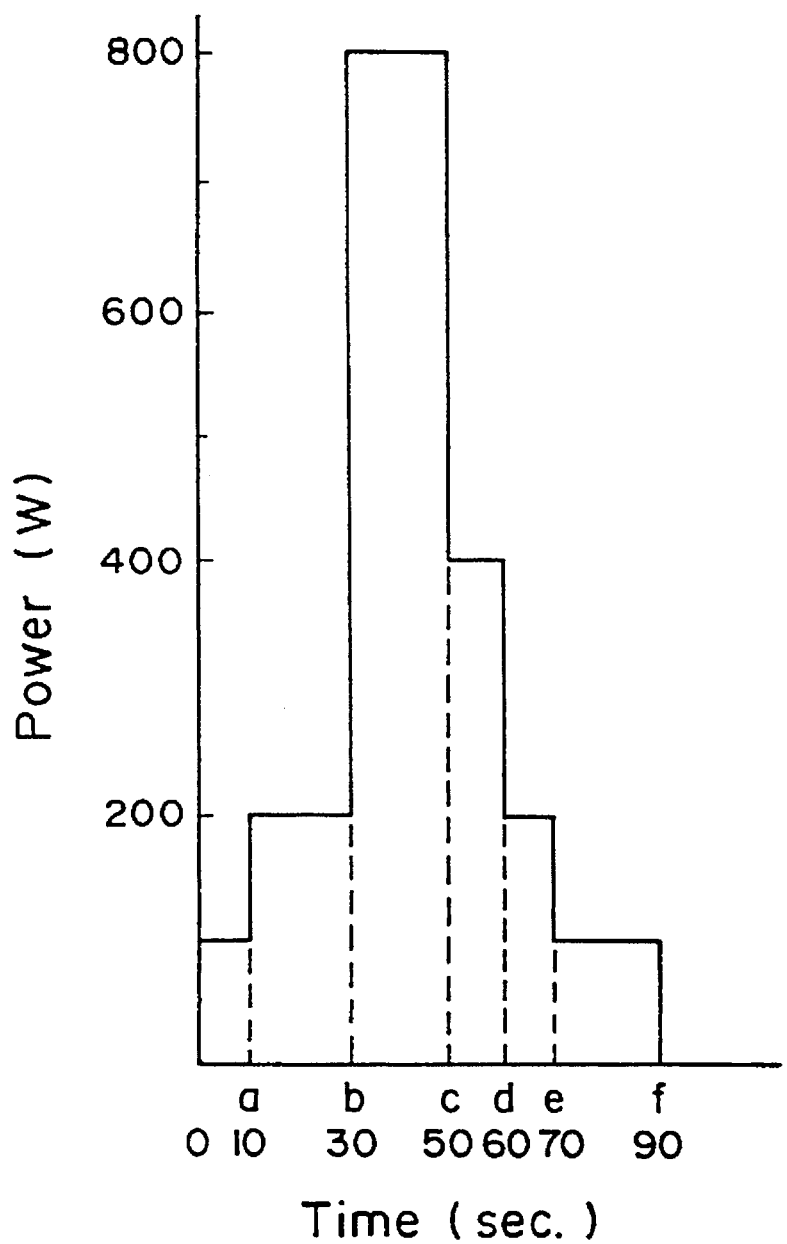
FIG. 8 is a graph of an electrical power vs. time which was adopted according to the invention in Example 2.
Figure 9:
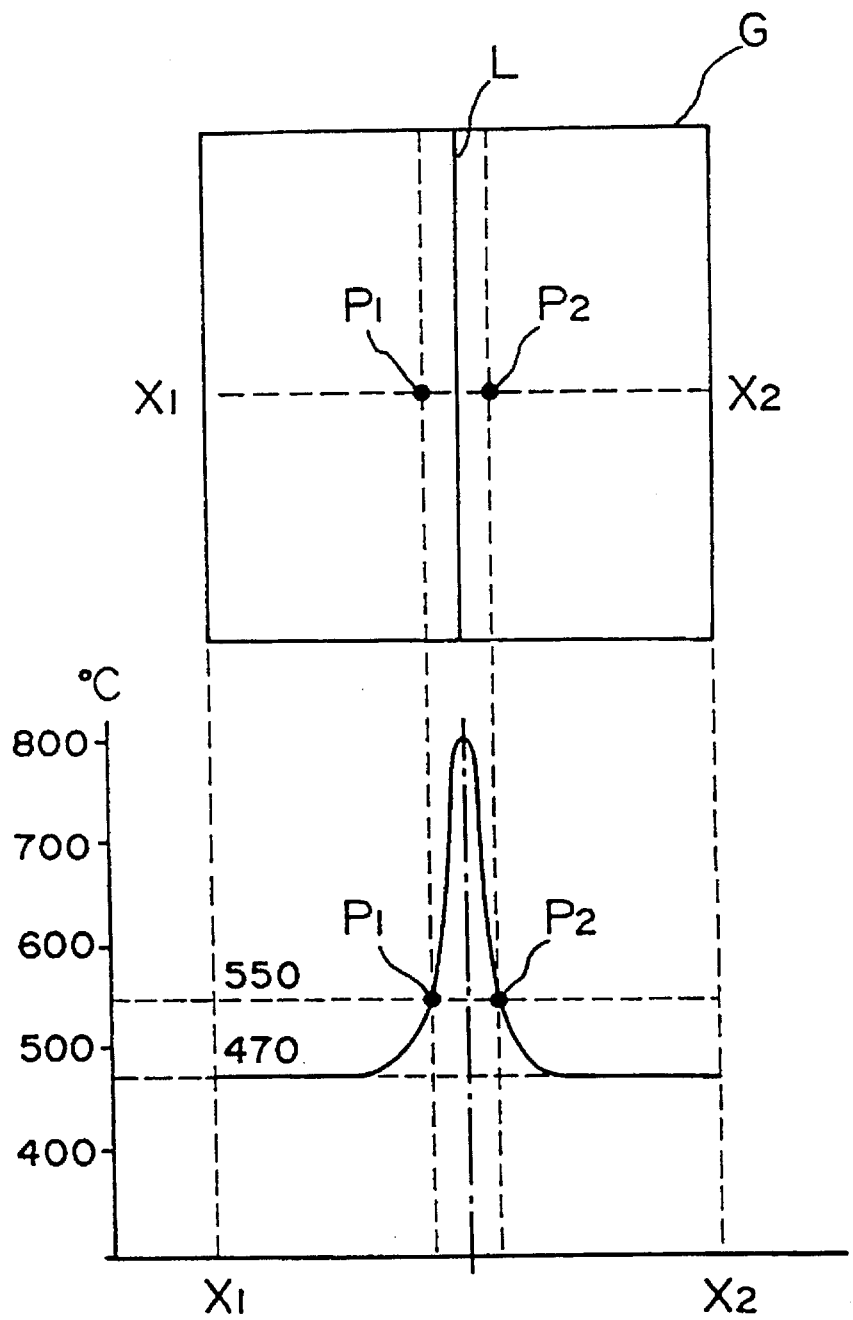
FIG. 9 is a glass sheet temperature profile transverse to a bend line when glass along the bend line was heated according to the invention in Example 2.

The glass sheet was then held by a glass sheet-holding mechanism having arms to which plates were attached to sandwich a glass sheet, and heated uniformly in an electric furnace to 470° C. Subsequently, an alternating current of 50 Hz was applied to the bend line in a power pattern as indicated in FIG. 8. At a point of time of 60 seconds after turning on electricity, d, the glass along the bend line was at a temperature of 800° C. Then, the heating power was decreased immediately, and the glass sheet-holding mechanism started to bend the glass sheet so that the angle between the straight sections of the glass sheet became 90 degrees in about 60 seconds. FIG. 9 shows a temperature profile along line $X_1X_2$ transverse the bend line at the point of time of 60 seconds after turning on electricity. Areas outside points, $P_1$ and $P_2$, spaced 15 mm from the bend line on the right and left sides were at temperatures not higher than 550° C. After the bending, the shaped glass sheet was annealed.

A radius of curvature of the outer circumference of the bend transverse to the bend in the shaped glass sheet thus produced was 6 mm, i.e., 1.2 times the thickness of the glass sheet, in the straight sections. In areas spaced at least 10 mm from the bend line transverse to the bend line, there was seen no transitional area in which the sheet would slightly warp and loose flatness. The straight sections of the shaped glass sheet maintained its original flatness as in the starting float method glass sheet, and exhibited absolutely no increase in optical seeing-through distortion and reflection distortion.

As seen above, the process of the invention using arc discharge heating makes it possible to heat a narrow area of a glass sheet along a bend line to at least a softening point in a very short period of time.

EXAMPLE 3

Two bent glass sheets produced as in Example 1 were layered with a space of 6 mm between the straight sections via a hollow square pillar space made of aluminium. The whole space in the hollow spacer was filled with silica gel as a drying agent. Gaps between the glass sheets and the spacer were filled with butyl rubber as a sealing material. A space between the glass sheets outside the spacer was filled with silicone rubber as a calking agent. Thus, a glass sheet structure as indicated in FIG. 7 were prepared.

The glass sheet structure had a very sharp bend, and flat straight sections which were not distorted and had a very good seeing-through property. After the use in a long period of time, cloud which would be caused by moisture in the sealed space between the glass sheets was not seen.

What we claim is:

1. A shaped glass sheet having at least one linear bend and two straight sections extending from the bend, characterized in that a radius of curvature of an outer circumference of the bend transverse to the bend is at most 4 times a thickness of the glass sheet and the straight sections of the shaped glass sheet are substantially flat, and wherein the thickness of the glass sheet is 3 mm or more.

2. The shaped glass sheet as claimed in claim 1, wherein the radius of curvature is at most twice as much as the thickness of the glass sheet.

3. The shaped glass sheet as claimed in claim 1, wherein there is a transitional area between the bend and each straight section and a width of the transitional area is at most twice the thickness of the glass sheet.

4. The shaped glass sheet as claimed in claim 3, wherein the width of the transitional area is at most the thickness of the glass sheet.

5. The shaped glass sheet as claimed in claim 1, wherein an interior angle between two adjacent plane parts is between 60 and 160 degrees.

6. A glass sheet structure composed of at least two glass sheets, a spacer which defines a space between the glass sheets, and a means of filling a gap between the glass sheets and the spacer, each of said sheets being a shaped glass sheet having at least one linear bend and two straight sections extending from the bend, characterized in that a radius of curvature of an outer circumference of the bend transverse to the bend is at most 4 times a thickness of the glass sheet and the straight sections of the shaped glass sheet are substantially flat and the sheets having approximately the same radii of curvature.

7. The glass sheet structure as claimed in claim 6, wherein the glass sheets are substantially parallel to each other.

8. The glass sheet structure as claimed in claim 6, wherein the space between the glass sheets is 3 to 60 mm.

* * * * *